United States Patent [19]

Yellin

[11] Patent Number: 5,794,044

[45] Date of Patent: Aug. 11, 1998

[54] SYSTEM AND METHOD FOR RUNTIME OPTIMIZATION OF PRIVATE VARIABLE FUNCTION CALLS IN A SECURE INTERPRETER

[75] Inventor: Frank Yellin, Redwood City, Calif.

[73] Assignee: Sun Microsystems, Inc., Mountain View, Calif.

[21] Appl. No.: 569,754

[22] Filed: Dec. 8, 1995

[51] Int. Cl.[6] .................................................. G06F 9/45
[52] U.S. Cl. ................................. 395/704; 395/683
[58] Field of Search ............................ 395/709, 705, 395/683, 701, 704

[56] References Cited

U.S. PATENT DOCUMENTS

| | | | |
|---|---|---|---|
| 4,775,932 | 10/1988 | Oxley et al. | 364/200 |
| 5,210,874 | 5/1993 | Karger | 395/650 |
| 5,280,614 | 1/1994 | Munroe et al. | 395/650 |
| 5,319,784 | 6/1994 | Parikh | 395/700 |
| 5,590,266 | 12/1996 | Carson et al. | 395/340 |
| 5,640,568 | 6/1997 | Komatsu | 395/705 |

OTHER PUBLICATIONS

A. Goldberg, D. Robson, Smalltalk-80 The Language, Addison-Wesley Publishing Company, pp. 8–9, 426–440, 1989.
B. Stroustrup, The C++ Programming Language, second edition, Addison-Wesley Publishing Company, pp. 17–19, 123–124, 146, 152–153, 293–295, 1991.

Primary Examiner—Alvin Oberlev
Assistant Examiner—Sue Lao
Attorney, Agent, or Firm—Gary S. Williams; Flehr Hohbach Test Albritton & Herbert LLP

[57] ABSTRACT

A secure program interpreter performs a special check the first time it executes a method call to determine if the sole purpose of the called method is to access the value of private variable, modify the value of a private variable, or return a constant value. If this is the case, the interpreter's internal representation of the method being executed is modified so as to directly access the private variable of the called method, or to directly access the stored constant of the called method. The modified method representation uses special "privileged" load and store instructions, not available in normal source code programs, that access private variables and constants outside the method being executed without causing a security violation to be flagged. When the modified portion of the method is executed, the private variable or constant is accessed directly by the executed method using a privileged load or store instruction, the use of which avoids the flagging of a security violation by the program interpreter. When execution of the program is completed, the modified internal representation of the method is flushed, such that when the program is executed again the interpreter generates a new working representation of the aforementioned method.

9 Claims, 4 Drawing Sheets

SYSTEM AND METHOD FOR RUNTIME OPTIMIZATION OF PRIVATE VARIABLE FUNCTION CALLS IN A SECURE INTERPRETER

The present invention relates generally to object oriented computer systems in which an interpreter executes object methods in a secure manner, and particularly to an improved interpreter for optimizing calls to methods whose sole purpose is to access the value of private variable, modify the value of a private variable, or return a constant value.

BACKGROUND OF THE INVENTION

In object-oriented programming languages, every object belongs to a specific "class," sometimes called an object class. The class of an object indicates what variables the object has and what actions ("methods") may be performed on an object.

Some variables (i.e., in objects) are marked "private." This marking indicates that the variable may only be accessed or modified by methods belonging to the same class as the object. They may not be modified or accessed from other classes. It is not uncommon for certain classes of objects to have methods whose sole purpose is to access the value of a private variable, modify the value of a private variable, or return a constant value. By creating such methods, the implementor of the class is better able to hide the details of the implementation of the class. It also gives the implementor greater freedom to re-implement the class, without requiring all users of the class to recompile their code.

However, method calls are often far more expensive (i.e., take much more CPU time) than variable accesses. Similarly, method calls are more expensive than accessing a constant value.

Some optimizing compilers will, when appropriate, automatically convert a method call into a simple variable access or modification, sometimes called "in-lining". However, this scheme is unacceptable within a secure environment for two reasons:

1) within the resulting optimized code, it will appear that the optimized code is directly using the private variable of an object of another class. However, a secure runtime system will notice this and flag a security violation. In particular, a secure runtime system must not normally allow a method to access private variables inside an object of another class; and 2) the author of the original class loses the ability to modify the implementation if there is a possibility that anyone has compiled optimized code against the "old" definition of the object class (i.e., with old versions of the methods that access private variables).

It is an object of the present invention to optimize the run time interpretation of methods that call upon other methods whose sole purpose is to access a private variable or constant value, but without creating a permanently revised program.

It is another object of the present invention to optimize a run time interpreter for efficient execution of methods whose sole purpose is to access a private variable or constant value in such a way that a security violation is avoided, without disabling the interpreter's normal security provisions for preventing a method of one class from accessing the private variables of an object of another class.

SUMMARY OF THE INVENTION

In summary, the present invention is a secure program interpreter for interpreting object oriented programs in a computer system having a memory that stores a plurality of objects of multiple classes and a plurality of procedures. In a preferred embodiment, a secure program interpreter performs a special check the first time it executes a method call to determine if the sole purpose of the called method is to access the value of a private variable of an instance of the called method's class, modify the value of a private variable of an instance of the called method's class, or return a constant value. If this is the case, the interpreter's internal representation of the method being executed is modified so as to directly access the private variable of an instance of the called method's class, or to directly access the stored constant of the called method.

The modified method representation, stored internally by the program interpreter, uses "special privileged" load and store instructions, not available in normal source code programs, that are allowed to access private variables in instances of objects of other classes and constants outside the method being executed. When the modified portion of the method is executed, the private variable or constant is accessed directly by the executed method using a privileged load or store instruction, the use of which avoids the flagging of a security violation by the program interpreter.

Furthermore, when execution of the entire program is completed, the modified internal representation of the method is flushed. As a result, the modification of the executed method is ephemeral. If any of the called methods are modified between uses of programs that execute the calling method, such as to revise the value assigned to a private variable or constant, or to have the method no longer simply access a private variable but instead to calculate a value, the revised version of the called methods will be used during such subsequent executions, thereby preserving the author's ability to modify the associated object class.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
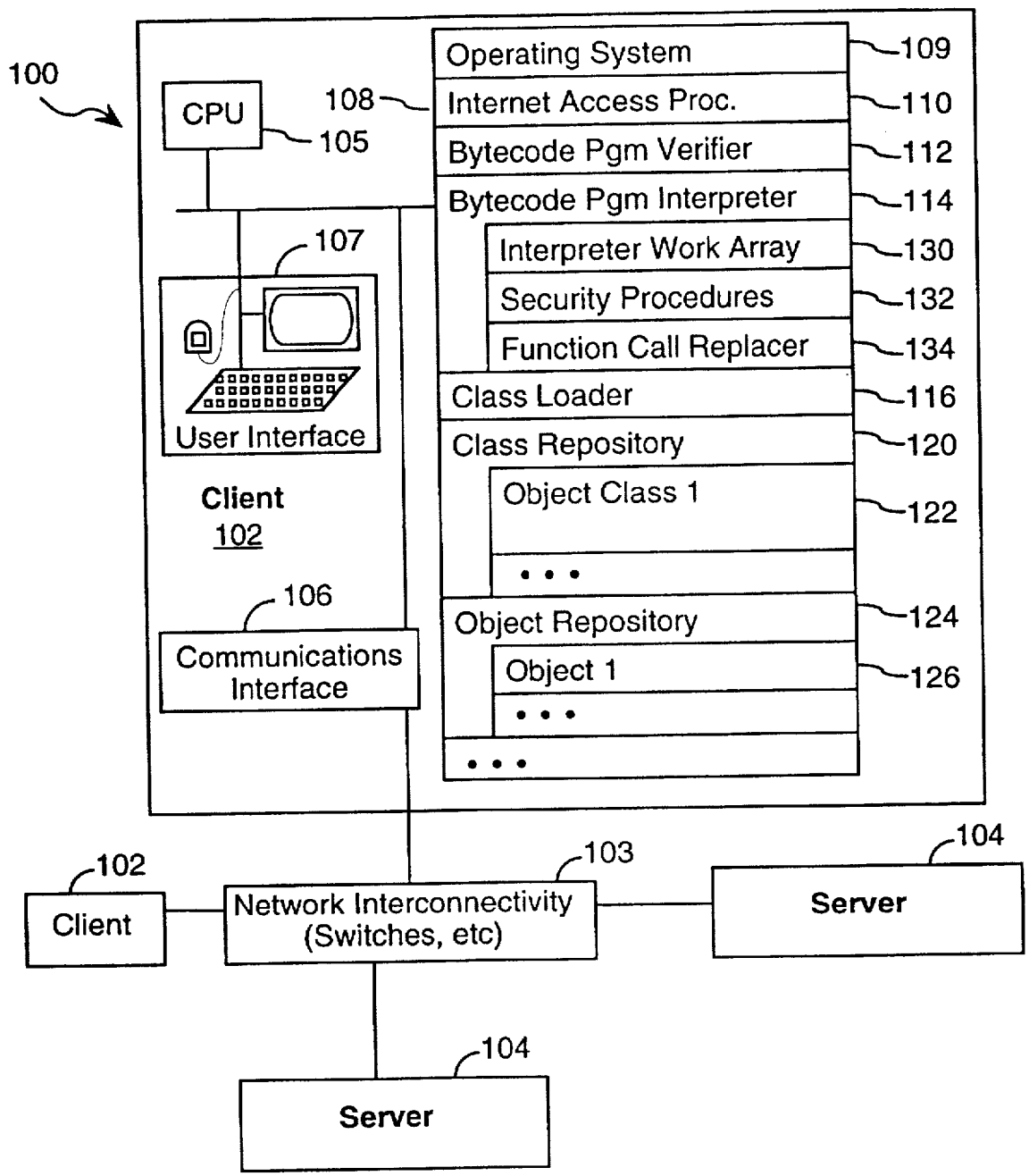
FIG. 1 is a block diagram of a computer system incorporating a preferred embodiment of the present invention.

Referring to FIG. 1, there is shown a distributed computer system 100 having multiple client computers 102 and multiple server computers 104. In the preferred embodiment, each client computer 102 is connected to the servers 104 via the Internet 103, although other types of communication connections could be used. While most client computers are desktop computers, such as Sun workstations, IBM compatible computers and Macintosh computers, virtually any type of computer can be a client computer. In the preferred embodiment, each client computer includes a CPU 105, a communications interface 106, a user interface 107, and memory 108. Memory 108 stores:

an operating system 109;

an Internet communications manager program 110;

a bytecode program verifier 112 for verifying whether or not a specified program satisfies certain predefined integrity criteria;

a bytecode program interpreter 114 for executing application programs;

a class loader 116, which loads object classes into a user's address space and utilizes the bytecode program verifier to verify the integrity of the methods associated with each loaded object class;

at least one class repository 120, for locally storing object classes 122 in use and/or available for use by user's of the computer 102;

at least one object repository 124 for storing objects 126, which are instances of objects of the object classes stored in the object repository 120.

In the preferred embodiment the operating system 109 is an object oriented multitasking operating system that supports multiple threads of execution within each defined address space. However, the present invention could be used in other types of computer systems, including computer systems that do not have an operating system.

The class loader 116 is typically invoked when a user first initiates execution of a procedure that requires that an object of the appropriate object class be generated. The class loader 116 loads in the appropriate object class and calls the bytecode program verifier 112 to verify the integrity of all the bytecode programs in the loaded object class. If all the methods are successfully verified, an object instance of the object class is generated, and the bytecode interpreter 114 is invoked to execute the user requested procedure, which is typically called a method. If the procedure requested by the user is not a bytecode program and if execution of the non-bytecode program is allowed (which is outside the scope of the present document), the program is executed by a compiled program executer (not shown).

The class loader is also invoked whenever an executing bytecode program encounters a call to an object method for an object class that has not yet been loaded into the user's address space. Once again the class loader 116 loads in the appropriate object class and calls the bytecode program verifier 112 to verify the integrity of all the bytecode programs in the loaded object class. In many situations the object class will be loaded from a remotely located computer, such as one of the servers 104 shown in FIG. 1. If all the methods in the loaded object class are successfully verified, an object instance of the object class is generated, and the bytecode interpreter 114 is invoked to execute the called object method.

As shown in FIG. 1, the bytecode program interpreter 114 includes a work array 130 in which a working representation of all currently loaded methods are temporarily stored. The working representation is stored internally to the interpreter and may be dynamically modified to optimize execution speed, as is discussed in more detail below.

In the preferred embodiment, the bytecode program interpreter 114 also includes security procedures 132 or instructions for preventing a number of program practices that are contrary to secure program execution requirements, including security instructions for preventing standard load and store instructions in one method from directly accessing a private variable in an object that is an instance of another class. When execution of any such instruction is attempted by the program interpreter, it flags the instruction as a security violation and aborts execution of the method that contains the instruction.

The bytecode program interpreter 114 furthermore includes a function call replacement procedure 134 for replacing procedure calls to certain types of simple methods with special instructions that directly access or modify associated private variables or that directly load an associated constant value.

Data Structures for Objects

Figure 2:
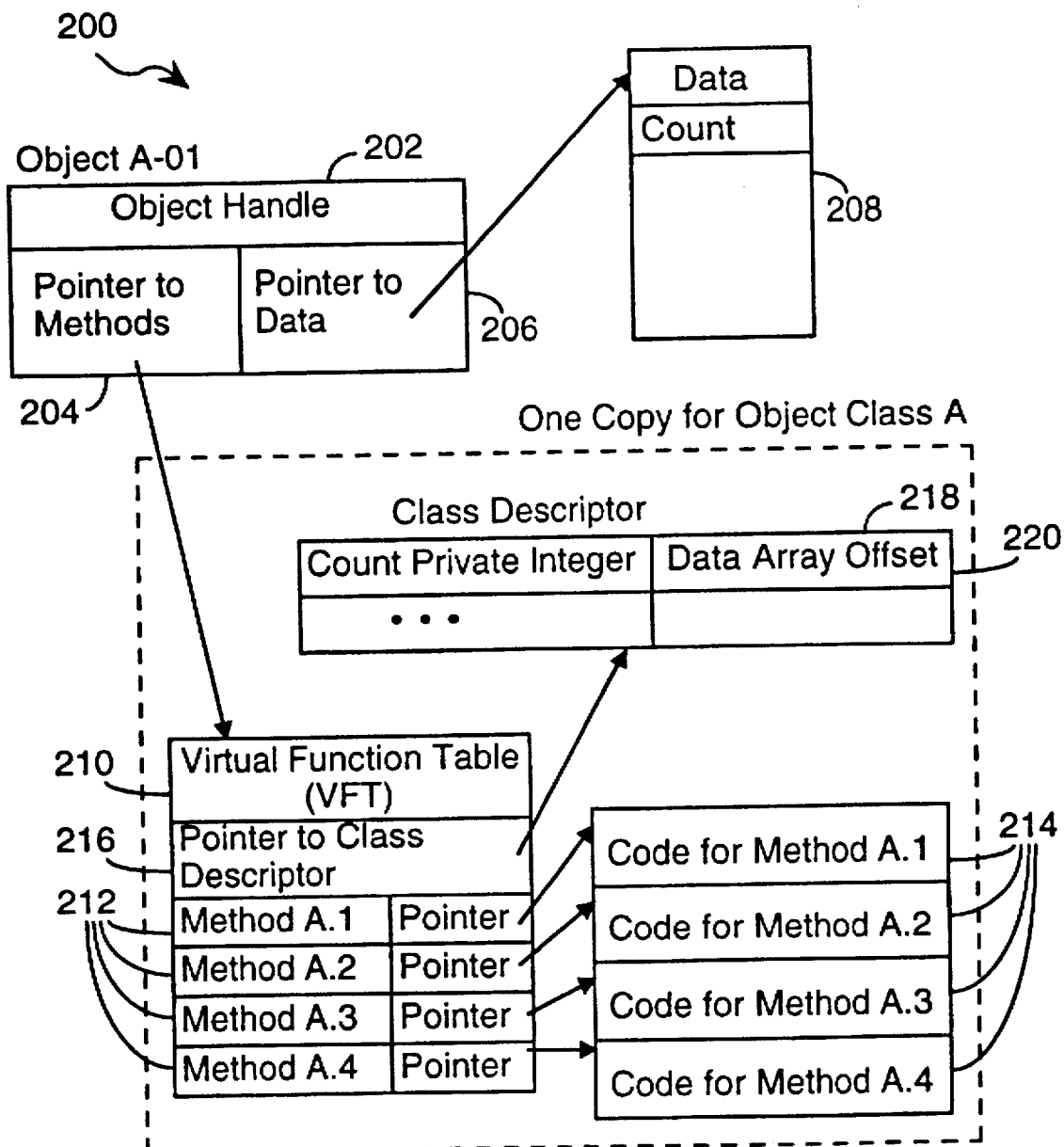
FIG. 2 is a block diagram of the data structure for an object in a preferred embodiment of the present invention.

FIG. 2 shows the data structure 200 for an object in a preferred embodiment of the present invention. An object of object class A has an object handle 202 that includes a pointer 204 to the methods for the object and a pointer 206 to a data array 208 for the object.

The pointer 204 to the object's methods is actually an indirect pointer to the methods of the associated object class. More particularly, the method pointer 204 points to the Virtual Function Table (VFT) 210 for the object's object class. Each object class has a VFT 210 that includes pointers 212 to each of the methods 214 of the object class. The VFT 210 also includes a pointer 216 to a data structure called the class descriptor 218 for the object class. The class descriptor 218 includes, in addition to items not relevant here, data array offsets 220 for each of the variables used by the methods of the object class (indicating where in the data array 208 the variable's value is stored). Furthermore, for each data offset item 220 the class descriptor includes an identification of the variable (e.g., the variable's name) plus an indicator of the data type of the variable (e.g., integer) and an indicator as to whether or not the variable is a private variable. In some embodiments the structure of objects is more complex than shown in FIG. 2, but those additional structural elements are not relevant to the discussion in this document.

Figure 3:
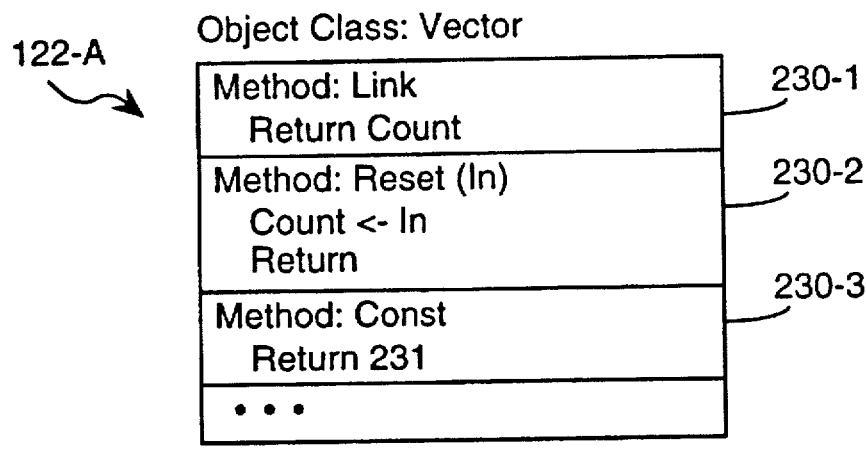
FIG. 3 is a block diagram of the data structure for an object class having a plurality of simple methods.

FIG. 3 shows the data structure 122-A for storing the methods 230 of an object class having several "simple methods". For the purposes of this document, the term "simple method" shall be defined to mean a method whose sole function is (A) returning a private variable's value, where the private variable is private to the simple procedure, (B) storing a specified value into the private variable, or (C) returning a constant value.

The security procedures 132 of the bytecode program interpreter prevent any method of one class from directly accessing the private variables of an object of another class.

Figure 4:
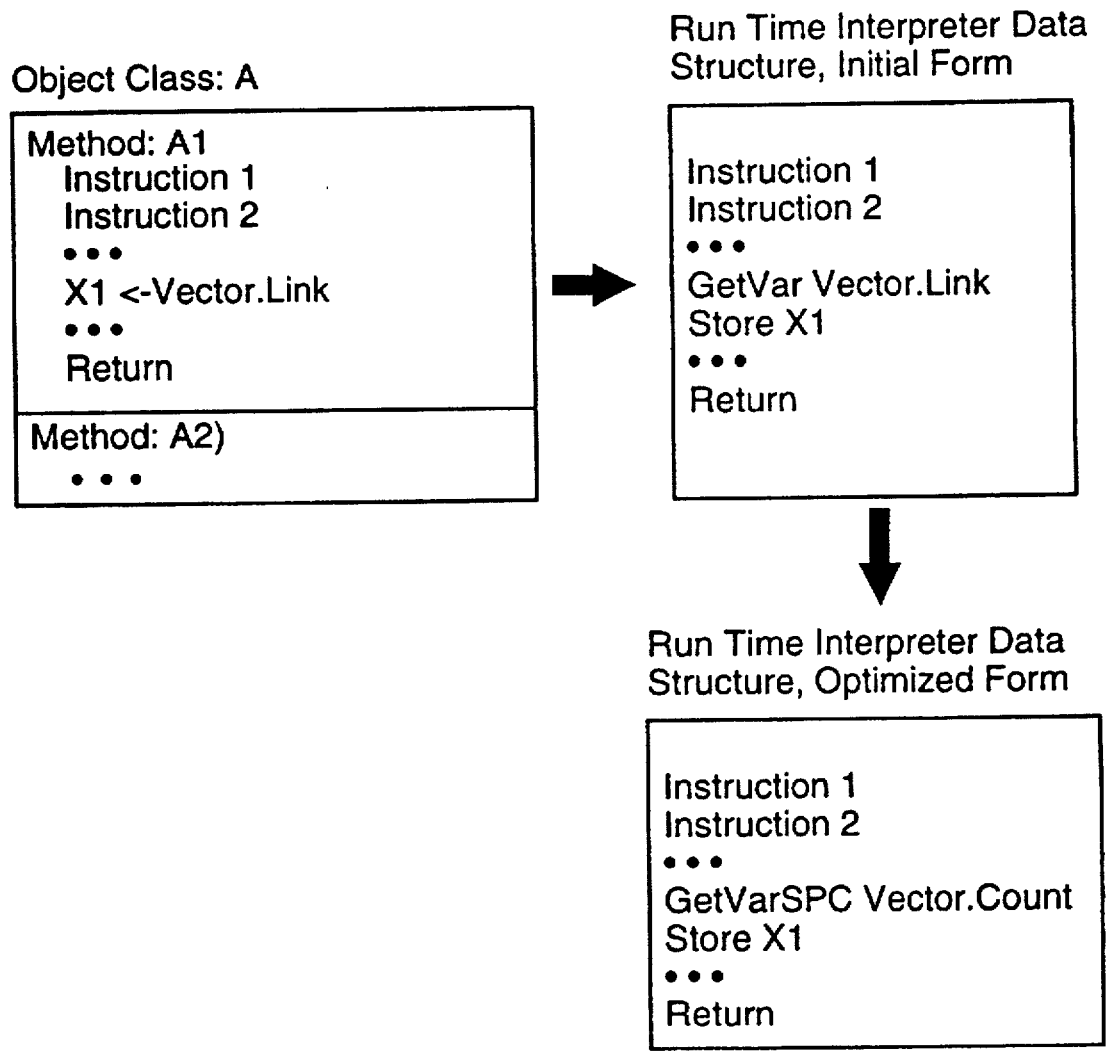
FIG. 4 is a conceptual representation of the method loading and optimization process of the present invention.

Referring to FIG. 4, the program code associated with a method in an object class is initially copied into the work array of the interpreter to form a working internal representation of the loaded method. That initial working representation of the method may then be modified by the interpreter in various ways to generate an optimized form of the working representation of the method. In the case of the present invention, the working representation of the method is modified so as to make procedure calls to simple methods more computationally efficient.

The Optimized Method Interpretation Methodology

Table 1 contains a pseudocode representation of the portion of the program interpreter procedure relevant to the present invention. The pseudocode used in Table 1 is, essentially, a computer language using universal computer language conventions. While the pseudocode employed here has been invented solely for the purposes of this description, it is designed to be easily understandable by any computer programmer skilled in the art.

Figure 5:
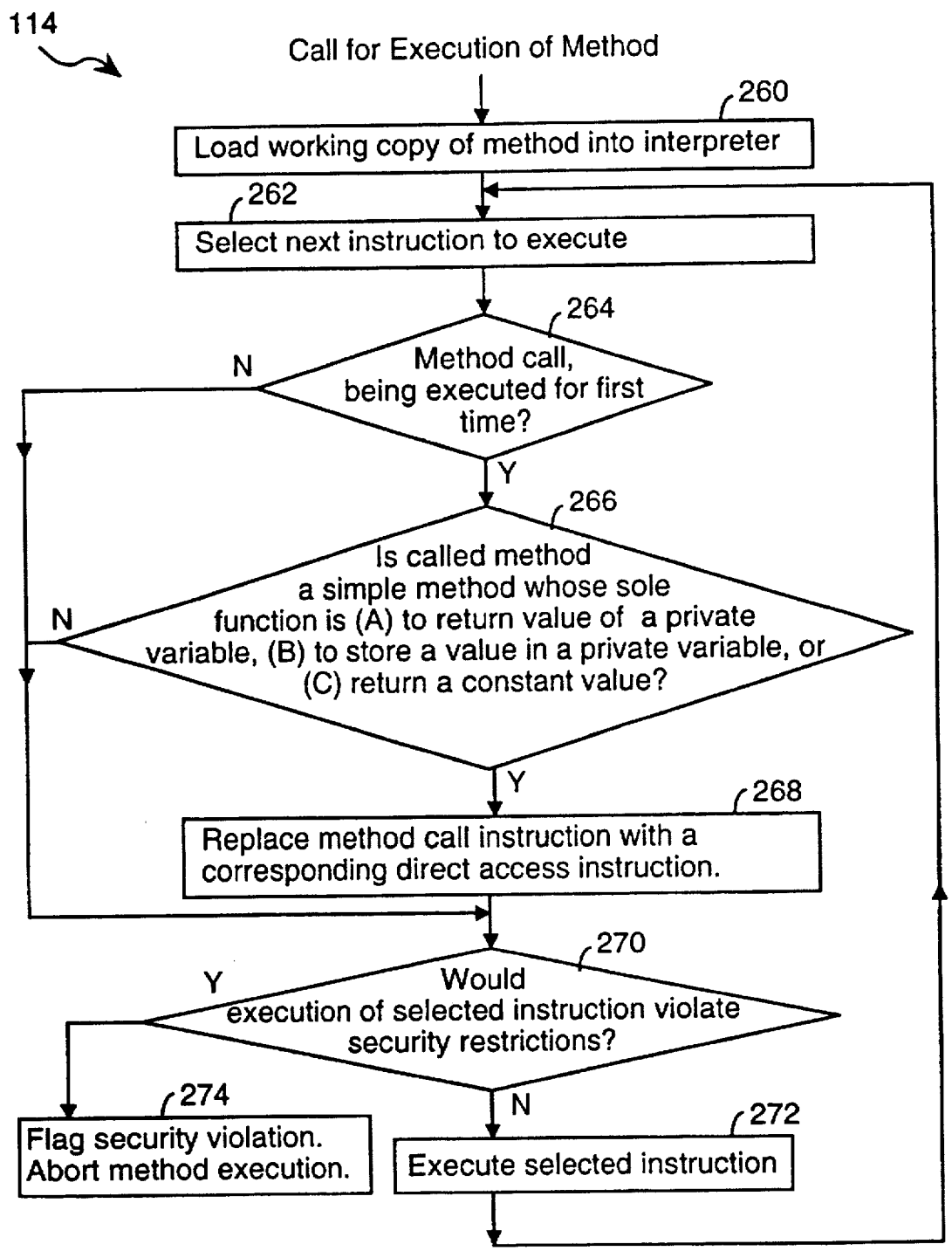
FIG. 5 is a flow chart of the program interpreter procedure used in a preferred embodiment of the present invention.

Referring to FIG. 5 and the pseudocode for the program interpreter procedure shown in Table 1, when execution of a method is requested, a working copy of the method is loaded into the interpreter's work array (260). During execution of the method by the interpreter, the interpreter selects a next instruction to execute (262). If the selected instruction is a method call that is being executed for the first time (264-Y) and the called method is a simple method whose sole function is (A) returning a private variable's value, where the private variable is private to the simple procedure, (B) storing a specified value into the private variable, or (C) returning a constant value (266-Y), then the method call is replaced with a corresponding direct access instruction (268).

In the preferred embodiment, a method call to a simple method whose sole function is returning a private variable's value is replaced with a special purpose load instruction that pushes onto the interpreter's operand stack the value of the referenced private variable:

GetVarSPC PrivateVariable where "GetVarSPC" is a special form of the Get Variable instruction that is exempted from the normal security restrictions prohibiting one method from directly accessing another method's private variables.

In the preferred embodiment, a method call to a simple method whose sole function is storing a specified value into a specified private variable is replaced with a special purpose store instruction that stores a value from the interpreter's operand stack into the referenced private variable:

SetVarSPC PrivateVariable where "SetVarSPC" is a special form of the stack-to-variable store instruction that is exempted from the normal security restrictions prohibiting one method from directly accessing the private variables of an object of another class.

In the preferred embodiment, a method call to a simple method whose sole function is returning a constant value is replaced with an instruction that gets the constant value:

Get ConstantValue where "Get" is the instruction for pushing a specified value onto the interpreter's operand stack.

After the working representation of the method being executed has been updated, if at all, by steps 264, 266, 268, the security procedures of the interpreter determine whether execution of the selected next instruction would violate any security restrictions (270). If not, the selected instruction is executed (272). If execution of the selected instruction would violate any security restrictions, such as the restriction on accessing private variables, then a security violation is flagged and execution of the method is aborted (274).

In summary, the present invention optimizes the execution of certain types of simple method calls by replacing those method calls with equivalent in-line direct access instructions, but does so in such a way that the in-line instructions are regenerated each time the calling method is reloaded for execution, thereby ensuring that any revisions of the called simple methods made by the owner or publisher of the programs are reflected in subsequent executions of the calling method.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

TABLE 1

PSEUDOCODE REPRESENTATION OF PROGRAM INTERPRETER

```
Procedure: INTERPRET (Method)
{
Load Method into internal Work Array
Do Forever
    {
    Case (Next Program Statement to be Executed):
        {
        Case = Anything other than a GetVarSPC, SetVarSPC or
            Method Call
            {
            Standard handling, unrelated to present invention
            }
        Case = GetVarSPC or SetVarSPC
            {
            Execute load to stack or store from stack instruction while
                suspending normal security prohibition against
                accessing private variables in methods other than the
                method being executed.
            }
        Case = Method Call
            {
            If this is the first time the method call is being executed
                since the calling method was loaded
                {
                If the only function of the called method is to read a
                    private variable and it would not be a security
                    violation for the called method to read that private
                    variable
                    {
                    Replace method call in internal representation of
                        the calling method with a special instruction
                        that directly accesses the private variable and
                        loads its value onto the operand stack:
                        GetVarSPC PrivateVariable
                    }
                If the only function of the called method is to store a
                    value into a private variable and it would not be a
                    security violation for the called method to store a
                    value into that private variable
                    {
                    Replace method call in internal representation of
                        the calling method with a special instruction
                        that directly accesses the private variable and
                        stores a value from the operand stack into
                        that private variable:
                        SetVarSPC PrivateVariable
                    {
                If the only function of the called method is to return a
                    constant value
                    {
                    Replace method call in internal representation of the
                        calling method with a special instruction
                        that directly loads the constant value onto the
                        operand stack:
                        Load ConstantValue
                    }
                Execute resulting instruction, or unchanged instruction,
                    as the case may be, applying standard security
                    restrictions.
            }/* end of Case=Method Call section /*
        }/* end of Case Statement */
    }/* end of Do Forever loop */
/* Execution of Method has completed */
Flush working representation of Method from said interpreter
Return
}
```

What is claimed is:

1. A computer system, comprising:

memory for storing a plurality of objects and a plurality of procedures, each said object comprising an instance of an associated object class and each said procedure belonging to a respective object class, said plurality of procedures including simple procedures wherein the entire function performed by each said simple procedure is selected from the group consisting of: (A)

returning a private variable's value, where said private variable is stored in and is private to an object of the object class to which said simple procedure belongs, (B) storing a specified value into said private variable, and (C) returning a constant value; and a secure program interpreter for executing selected ones of said procedures, said interpreter providing private variable security to restrict access to said private variable, said interpreter including a load subprocedure for generating a working representation of a first one of said procedures to be executed, and an optimization subprocedure for optimizing execution of said simple procedures when called by other ones of said procedures, said optimization subprocedure determining, when said interpreter is processing a procedure call in said first procedure to a second one of said procedures, whether said second procedure is one of said simple procedures, and if said determination is positive, replacing said procedure call in said working representation of said first procedure with a direct access instruction that does not violate the private variable security provided by the secure program interpreter, wherein said direct access instruction is selected from the group consisting of (A) a first instruction that directly returns said private variable's value, (B) a second instruction that directly stores a specified value into said private variable, and (C) a third instruction that directly returns said constant value.

2. The computer system of claim 1, wherein said interpreter includes security instructions for preventing standard instructions that load a variable's value into an operand stack and that store a value on the operand stack into a variable from accessing any private variable that is not stored in an object of the object class for the procedure in which said standard instructions reside; and said first and second instructions are special purpose instructions that access said private variable without causing a security violation to be flagged by said security instructions even if said first procedure and second procedure belong to different respective object classes.

3. The computer system of claim 2, wherein said interpreter includes instructions for flushing said working representation of said first procedure from said procedure interpreter when execution of said first procedure terminates, such that when said first procedure is executed again said interpreter generates a new working representation of said first procedure.

4. A method of operating a computer system, comprising the steps of:

storing a plurality of objects and a plurality of procedures in a computer memory, each said object comprising an instance of an associated object class and each said procedure belonging to a respective object class, said plurality of procedures including simple procedures wherein the entire function performed by each said simple procedure is selected from the group consisting of: (A) returning a private variable's value, where said private variable is private to an object of the object class to which said simple procedure belongs, (B) storing a specified value into said private variable, and (C) returning a constant value;

under the control of a secure program interpreter, said interpreter providing private variable security to restrict access to said private variable, executing selected ones of said procedures, including generating a working representation of a first one of said procedures to be executed, and optimizing execution of any of said simple procedures when called by said first procedure, said optimizing step including determining, when said interpreter is processing a procedure call in said first procedure to a second one of said procedures, whether said second procedure is one of said simple procedures, and if said determination is positive, replacing said procedure call in said working representation of said first procedure with a direct access instruction that does not violate the private variable security provided by the secure program interpreter, wherein said direct access instruction is selected from the group consisting of (A) a first instruction that directly returns said private variable's value, (B) a second instruction that directly stores a specified value into said private variable, and (C) a third instruction that directly returns said constant value.

5. The method of claim 4, wherein said first and second instructions are special purpose instructions, said method including the steps of:

preventing standard instructions for loading a variable's value into an operand stack and for storing a value on the operand stack into a variable from accessing any private variable outside the procedure in which said standard instructions reside, and flagging a security violation when execution of any standard instruction would require accessing any private variable that is not stored in an object of the object class for the procedure in which said standard instructions reside; and enabling said first and second instructions to access said private variable without causing a security violation to be flagged even if said first procedure and second procedure belong to different respective object classes.

6. The method of claim 5, including:

flushing said working representation of said first procedure from said interpreter when execution of said first procedure terminates, such that when said first procedure is executed again said interpreter generates a new working representation of said first procedure.

7. A memory for storing data for access by programs being executed on a data processing system, said memory comprising:

a plurality of objects and a plurality of procedures stored in said memory, each said object comprising an instance of an associated object class and each said procedure belonging to a respective object class, said plurality of procedures including simple procedures wherein the entire function performed by each said simple procedure is selected from the group consisting of: (A) returning a private variable's value, where said private variable is stored in and is private to an object of the object class to which said simple procedure belongs, (B) storing a specified value into said private variable, and (C) returning a constant value; and a secure program interpreter, stored in said memory, for executing selected ones of said procedures, said interpreter providing private variable security to restrict access to said private variable, said interpreter including a load subprocedure for generating a working representation of a first one of said procedures to be executed, and an optimization subprocedure for optimizing execution of said simple procedures when called by other ones of said procedures, said optimization subprocedure determining, when said interpreter is processing a procedure call in said first procedure to a second one of said procedures, whether said second procedure is one of said simple procedures, and if said determination is positive, replacing said procedure call in said working representation of said first procedure with a direct access instruction that does not violate the private variable security provided by the secure program interpreter, wherein said direct access instruction is selected from the group consisting of (A) a first instruction that directly returns said private variable's value, (B) a second instruction that directly stores a specified value into said private variable, and (C) a third instruction that directly returns said constant value.

8. The memory of claim 7, wherein said interpreter includes security instructions for preventing standard instructions that load a variable's value into an operand stack and that store a value on the operand stack into a variable from accessing any private variable that is not stored in an object of the object class for the procedure in which said standard instructions reside; and said first and second instructions are special purpose instructions that can access said private variable without causing a security violation to be flagged by said security instructions even if said first procedure and second procedure belong to different respective object classes.

9. The memory of claim 8, wherein said interpreter includes instructions for flushing said working representation of said first procedure from said procedure interpreter when execution of said first procedure terminates, such that when said first procedure is executed again said interpreter generates a new working representation of said first procedure.

\* \* \* \* \*